United States Patent
Gonidec et al.

(10) Patent No.: US 12,077,309 B2
(45) Date of Patent: Sep. 3, 2024

(54) REINFORCED ACOUSTIC TREATMENT PANEL FOR AN AIRCRAFT PROPULSION UNIT

(71) Applicant: SAFRAN NACELLES, Gonfreville-l'Orcher (FR)

(72) Inventors: Patrick Gonidec, Moissy-Cramayel (FR); Albin Lafont, Moissy-Cramayel (FR); Virginie Emmanuelle Anne-Marie Digeos, Moissy-Cramayel (FR); Stuart Hardyman, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/571,073

(22) PCT Filed: Jun. 10, 2022

(86) PCT No.: PCT/FR2022/051110
§ 371 (c)(1),
(2) Date: Dec. 15, 2023

(87) PCT Pub. No.: WO2022/263751
PCT Pub. Date: Dec. 22, 2022

(65) Prior Publication Data
US 2024/0217667 A1    Jul. 4, 2024

(30) Foreign Application Priority Data
Jun. 15, 2021    (FR) ...................... 2106342

(51) Int. Cl.
*B64D 33/02*    (2006.01)
*F02C 7/045*    (2006.01)
*G10K 11/168*   (2006.01)

(52) U.S. Cl.
CPC .............. *B64D 33/02* (2013.01); *F02C 7/045* (2013.01); *B64D 2033/0206* (2013.01);
(Continued)

(58) Field of Classification Search
CPC . B64D 33/02; B64D 2033/0206; F02C 7/045; F05D 2220/323; F05D 2250/283; F05D 2260/96; G10K 11/168
See application file for complete search history.

(56) References Cited

U.S. PATENT DOCUMENTS 4,265,955 A      5/1981   Harp et al.
9,514,734 B1 *  12/2016   Jones ................... G10K 11/161
(Continued)

FOREIGN PATENT DOCUMENTS

EP       0311931 A2    4/1989
EP       0311931 A3    4/1989

OTHER PUBLICATIONS

Search Report and Written Opinion issued in International Application No. PCT/FR2022/051110, mailed Sep. 8, 2022.
(Continued)

*Primary Examiner* — Forrest M Phillips
(74) *Attorney, Agent, or Firm* — Bookoff McAndrews, PLLC (57) ABSTRACT

An acoustic treatment panel intended to be disposed on at least one wall of an aircraft propulsion unit in contact with a fluidic flow, the panel including a first, acoustically reflective skin, a second, acoustically porous skin intended to be in contact with the fluidic flow, and a honeycomb structure extending between the first skin and the second skin and having a plurality of cavities. The panel includes at least one acoustically transparent reinforcing wall passing through a plurality of cavities of the honeycomb structure and extend-
(Continued)

ing from the second skin to the first skin, forming a non-orthogonal angle with the first and second skins.

12 Claims, 4 Drawing Sheets

(52) U.S. Cl.
CPC .. *F05D 2220/323* (2013.01); *F05D 2250/283* (2013.01); *F05D 2260/96* (2013.01); *G10K 11/168* (2013.01)

(56) References Cited

U.S. PATENT DOCUMENTS

| | | | |
|---|---|---|---|
| 9,604,438 B2* | 3/2017 | Lumbab | F02C 7/24 |
| 10,436,118 B2* | 10/2019 | Weaver | F02C 7/045 |
| 11,830,468 B2* | 11/2023 | Henderson | G10K 11/168 |
| 2009/0173572 A1* | 7/2009 | Grenzing | G10K 11/172 |
| | | | 181/292 |
| 2013/0126265 A1 | 5/2013 | Sternberger et al. | |
| 2014/0341744 A1* | 11/2014 | Cazuc | F02K 1/827 |
| | | | 416/223 A |

OTHER PUBLICATIONS

Search Report issued in French Application No. 2106342, mailed Feb. 16, 2022.

* cited by examiner

REINFORCED ACOUSTIC TREATMENT PANEL FOR AN AIRCRAFT PROPULSION UNIT

CROSS-REFERENCE TO RELATED APPLICATIONS

This is a National Stage Application under 35 U.S.C. § 371 of International Application No. PCT/FR2022/051110, filed Jun. 10, 2022, now published as WO 2022/263751 A1, which claims priority to French Patent Application No. 2106342, filed on Jun. 15, 2021.

TECHNICAL FIELD

The invention relates to an acoustic treatment panel for absorbing sound waves and, more particularly, a panel also constituting a working element of a structure.

PRIOR ART

Conventionally, reducing the noise of a turbojet engine, and more precisely the noise radiated by the interaction between the rotors and their surroundings, is achieved using absorbent panels disposed on the wetted surfaces of the ducts in which the sound waves propagate. The term "wetted surfaces" shall mean the surfaces in contact with a fluid flow. These panels are sandwich-type composite materials formed by a perforated (or acoustically porous) skin which faces the noise generating area, a rear skin and a honeycomb-type cellular structure enclosed between the rear skin and the perforated skin, and the absorbent properties of which are in part obtained using the principle of Helmholtz resonators formed by the honeycomb cells of the honeycomb forming acoustic absorption cells. These cells can have substantially prismatic shapes perpendicular to the skins; one or more additional perforated skins can also be added.

In general, the structural strength of the panel under bending is provided by the skins, the honeycomb substantially providing the role of shear transmission between the skins, in a manner analogous to the core of a beam. These panels can also be stressed in traction, with a tensile force exerted on one side by the inner skin and on the other side by the outer skin. This latter case is very common on an air inlet where it is necessary to connect the perforated aerodynamic skin on the monolithic lip of the air inlet, but where the connection of the panel to the engine flange passes via a flange that is necessarily connected to the rear skin of the acoustic panel. This configuration causes shearing induced by the thrust forces of the lip and their necessarily misaligned flange reaction.

Both in the case of traction and bending, a major structural design problem arises relating to the concentration of shear stresses at the edges of these acoustic panels, and in particular in the connection areas of the panel with the remainder of the structure.

Some acoustic panel architectures make it possible to have an orthogonal cross-section of the two skins without providing a specific connection between the skins. In this architectural configuration, the honeycomb is much more sensitive to shear forces. Consequently, acoustic panels with such an architecture are instead intended to be disposed in locations where they are subject to few shear stresses or highly optimised locations in terms of the introduction of forces. This architecture nevertheless remains exceptional.

More specifically, in the majority of cases, the edges, or contours, of the acoustic panels correspond to structural connection areas, often with the introduction of a significant transverse force. This causes a shearing which the majority of honeycombs cannot accommodate, even with acoustic absorption cells having cavities which have been filled by a structural component (strong foam or resin) referred to as "potting".

Figure 1:
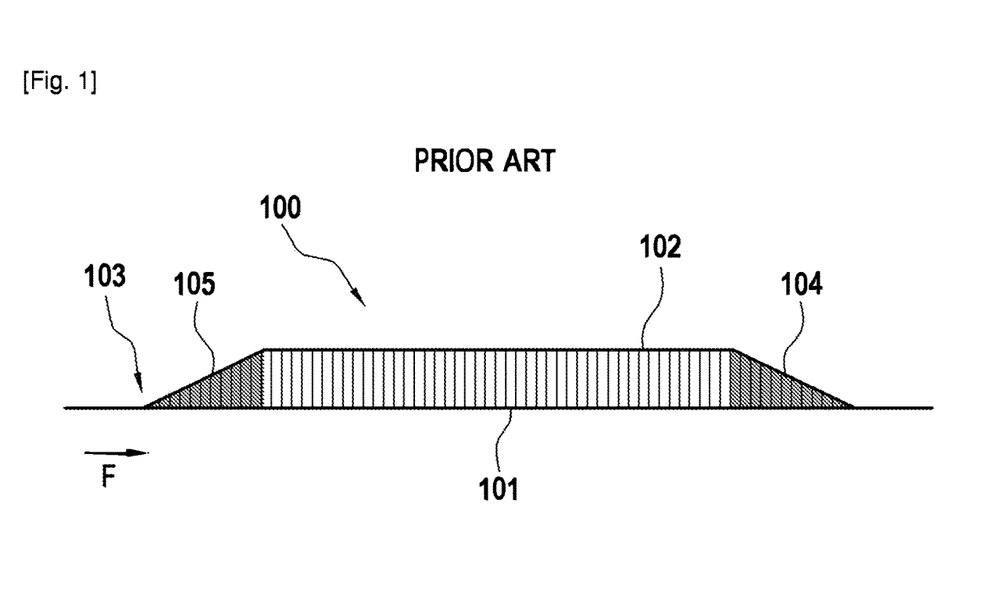
FIG. 1, already described, illustrates a sectional view of an acoustic treatment panel according to the prior art.

The most common solution illustrated in FIG. 1, which shows an acoustic panel 100 of the prior art, is then to join the front skin 101, the perforated skin, and the rear skin 102 and of bind them together over the entire perimeter 103 of the acoustic panel 100. This is called edging of the panel Pa.

In general, in order to produce an edging as illustrated in FIG. 1, the shape of the front skin 101 intended to be in contact with a fluid flow F is conserved, while that of the rear skin 102 is modified as a chamfer 104 in order that the rear skin 102 joins the front skin 101, the front skin 101 forming a so-called docking angle with the rear skin 102. There is then an inclined edging, which is by far the most applied.

Despite this design trick, this area frequently remains very critical in terms of shear. The more obtuse the docking angle of the two skins, the higher the shear peak, in particular when this angle exceeds 60°. However, the acoustic treatment is only effective if the honeycomb has a certain height adapted to the frequency of the noise to be attenuated. A low docking angle has the effect of having a significant border with cells not having their full height, which thus induces a significant loss of effective surface area around the perimeter of the panel, especially since these areas generally remain filled with reinforcing resin 105 (potting), which then completely cancels the acoustic attenuation effect.

With a traditional design, the good structural behaviour of the edging unfortunately harms the acoustic performance of the sandwich panel, at least over its peripheral areas.

It is possible to considerably reinforce the rear skin in order to make it absorb the shear in the case where the edging angle is large, or even equal to 90°, but this is to the detriment of the mass and often keeps a portion of the cellular structure filled with potting. This design favours the acoustics but penalises the mass and/or the structural behaviour of the panel.

This is more so, when an acoustic treatment panel is disposed on a wall of an air inlet of a turbomachine, downstream of a lip delimiting the air inlet, this panel generally being connected to the surrounding structure in an awkward manner, in particular via a Z-shaped angle plate or an inclined edging, subject to tensile forces. The majority of these problems arise from the fact that it is necessary to go around the honeycomb of the acoustic panel in order to connect the wall forming the lip to the rear skin of the panel, while the wall forming the lip is at the same level as the front skin. This induces either a lessening of the acoustic reduction (inclined edging), or a poorly arranged structure (ultimately with an impact on the mass).

Furthermore, in this configuration, and more particularly if a part of the lip is provided with an acoustic treatment when using pneumatic defrosting, the front partition is strongly heated. As a result, the extended integrated acoustic panel is exposed to high temperatures and must be made of more expensive heat-resistant materials. Moreover, in the prior art, the attachment of this panel to the remainder of the inner panel of the air inlet is carried out substantially at the location of the junction between the front partition and the inner panel. As a result this partition requires either a non-acoustic area situated between the "hot" lip acoustic panel and the inner panel, or it is connected to the inner panel, which induces an often-unacceptable heat flow for the inner panel. This results respectively in either a loss of acoustic effectiveness or a loss of structural effectiveness which can be compensated by the addition of a reinforcement of the rear skin at the front of the inner panel in the form of thermally insulating inserts which are very delicate and expensive to manufacture and which generate an increase in mass.

DISCLOSURE OF THE INVENTION

The invention aims to provide an acoustic treatment panel for a turbomachine which can solve the problems of force transfer and edging shear mentioned above, without significantly compromising the acoustic behaviour of the edges of the acoustic panel. In other words, the invention aims to provide an acoustic treatment panel having a structural reinforcement that makes it possible to have a better resistance to shear stresses to which it may be subject when the turbomachine is in operation, while using the entire surface of the panel for the acoustic treatment.

One object of the invention proposes an acoustic treatment panel intended to be disposed on at least one wall of an aircraft propulsion unit in contact with a fluidic flow, the panel comprising a first, acoustically reflective skin, a second, acoustically porous skin intended to be in contact with the fluid flow, and a honeycomb structure extending between the first skin and the second skin and having a plurality of cavities.

According to a general feature of the subject matter, the acoustic treatment panel comprises at least one acoustically transparent reinforcing wall passing through a plurality of cavities of the honeycomb structure and extending from the second skin to the first skin, forming a non-orthogonal angle with the first and second skins.

The term "acoustically porous wall" shall mean a wall which comprises orifices allowing a part of the acoustic waves to pass without significantly altering them, whether this be in terms of intensity or frequency. The term "acoustically opaque wall" or "acoustically reflective wall" shall mean a wall which does not allow any acoustic wave to pass without at least partially altering them, in particular in intensity. An acoustically opaque wall will reflect the majority of incident acoustic waves.

The term "aircraft propulsion unit" shall mean the unit comprising a turbojet engine and a nacelle.

The link between the first skin and the second skin provided by the reinforcing wall thus makes it possible to improve the resistance of the acoustic treatment panel to shear forces to which it may be subject. Further, through the acoustic transparency of the reinforcing wall, this structural reinforcement is conferred on the acoustic treatment panel without degrading the surface of the panel enabling an acoustic absorption to be produced, in other words without degrading the effectiveness of the acoustic treatment of the panel.

According to a first aspect of the acoustic treatment panel, said acoustically transparent reinforcing wall preferably has a perforation rate greater than or equal to 18%.

A minimum perforation rate of 18% of the reinforcing wall can ensure acoustic transparency of the reinforcing wall. The perforation rate corresponds to the ratio between the total perforated surface area of the reinforcing wall and the total surface area of the reinforcing wall, perforated or otherwise.

The perforation rate is preferably less than 80% in order to ensure acoustic transparency of the reinforcing wall, while maintaining a good force transfer capacity.

According to a second aspect of the acoustic treatment panel, the honeycomb structure can extend in a plane parallel to the second skin, inside an outer perimeter, and said at least one reinforcing wall can extend inside the honeycomb structure from the second skin to the first skin over a border portion of the honeycomb structure extending, in the plane parallel to the second skin, from said outer perimeter to the interior of the honeycomb structure.

The reinforcement wall or walls are thus only located on the one or more edges of the acoustic treatment panel.

According to a third aspect of the acoustic treatment panel, said at least one reinforcing wall can be formed in one piece with the first acoustically reflective wall.

According to a fourth aspect of the acoustic treatment panel, the panel can further comprise at least one portion of panel extending, in a direction orthogonal to the first skin, between a reinforcing wall and a portion of the first skin, said at least one portion of panel being attached and fixed to the remainder of the panel by co-firing during the manufacture of the panel Another object of the invention proposes an aircraft propulsion unit intended to be mounted on an aircraft, the propulsion unit comprising at least one acoustic treatment panel, as defined above.

According to a first aspect of the propulsion unit, it can comprise at least one air inlet provided with a front lip, an outer wall and an inner wall, and connected to one of said acoustic treatment panels forming at least one part of the inner wall.

According to a second aspect of the propulsion unit, said reinforcing wall of said acoustic treatment panel can continue outside said panel and be connected to the front lip of the air inlet.

Another object of the invention proposes an aircraft comprising at least one propulsion unit as defined above.

Another object of the invention proposes a method for manufacturing an acoustic treatment panel intended to be disposed on at least one wall of an aircraft propulsion unit in contact with a fluid flow, the method for manufacturing the panel comprising a step of stacking a first acoustically reflective skin, a honeycomb structure and a second, acoustically porous skin intended to be in contact with the fluid flow, and a honeycomb structure extending between the first skin and the second skin and having a plurality of cavities.

According to a general feature of the method according to the invention, the method may further comprise a step of installing at least one acoustically transparent reinforcing wall passing through a plurality of cavities of the honeycomb structure and extending from the second skin to the first skin, forming a non-orthogonal angle with the first and second skins.

According to an aspect of the method according to the invention, the method may further comprise a step of producing at least one portion of panel intended to extend, in a direction orthogonal to the first skin, between a reinforcing wall and a portion of the first skin, and a step of connecting, by co-firing, said at least one portion of panel to the remainder of the panel.

BRIEF DESCRIPTION OF THE FIGURES

The invention will be better understood on reading the following, given by way of indication and not limiting, with reference to the attached drawings, in which.

DESCRIPTION OF THE EMBODIMENTS

Figure 2:
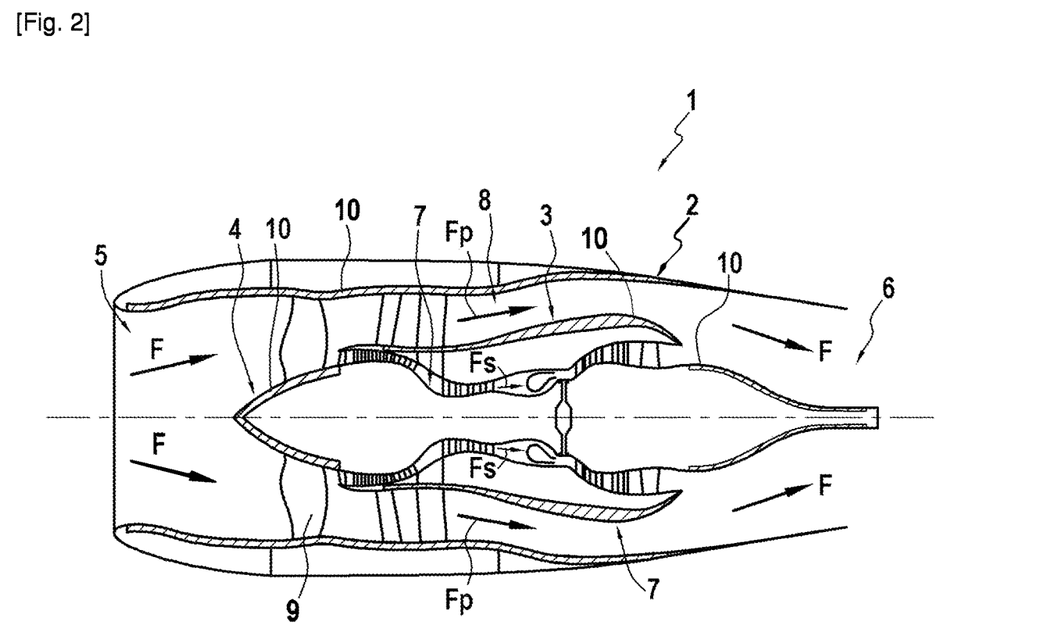
FIG. 2 shows a sectional view of a propulsion unit of an aircraft according to an embodiment of the invention, in a longitudinal plane of the propulsion unit of an aircraft.

FIG. 2 shows a sectional view of a propulsion unit 1 of an aircraft according to a non-limiting embodiment of the invention, in a longitudinal plane of the propulsion unit 1.

The propulsion unit 1 comprises a nacelle 2, an intermediate casing 3 and an inner casing 4. The nacelle 2 and the two casings 3 and 4 are coaxial. The nacelle 2 defines, at a first end, an inlet channel 5 of a fluid flow and, at a second end, opposite the first end, an exhaust channel 6 of a fluid flow. The nacelle 2 and the intermediate casing 3 between them delimit a fluid flow primary flow path 7. The intermediate casing 3 and the inner casing 4 delimit between them a fluid flow secondary flow path 8. The primary flow path 7 and the secondary flow path 8 are disposed in an axial direction of the propulsion unit between the inlet channel 5 and the exhaust channel 6.

The propulsion unit 1 further comprises a fan 9 configured to deliver an air flow F as fluid flow, the air flow F being divided at the outlet of the fan into a primary flow FP circulating in the primary flow path 7 and a secondary flow FS circulating in the secondary flow path 8.

The propulsion unit 1 further comprises at least one acoustic treatment panel 10 configured to attenuate the acoustic waves emitted by the propulsion unit 1 before these waves are radially exhausted to the outside of the nacelle 2 of the propulsion unit 1.

In the case of an unducted turbomachine, the acoustic treatment would be configured to attenuate or limit the refraction of the acoustic waves radiated by the propellers.

Each acoustic treatment panel 10 is configured to attenuate acoustic waves having a frequency belonging to a predetermined frequency range. In the embodiment illustrated in FIG. 1, the acoustic treatment panels 10 are incorporated in the nacelle 2, the intermediate casing 3 and the inner casing 4. On the inner casing 4, the acoustic treatment panels 10 are incorporated, on the one hand, on the upstream portion of the intermediate casing 3 in the axial direction and in particular on the portion bearing the fan 9 and, on the other hand, on a downstream portion of the intermediate casing 3.

Figure 3:
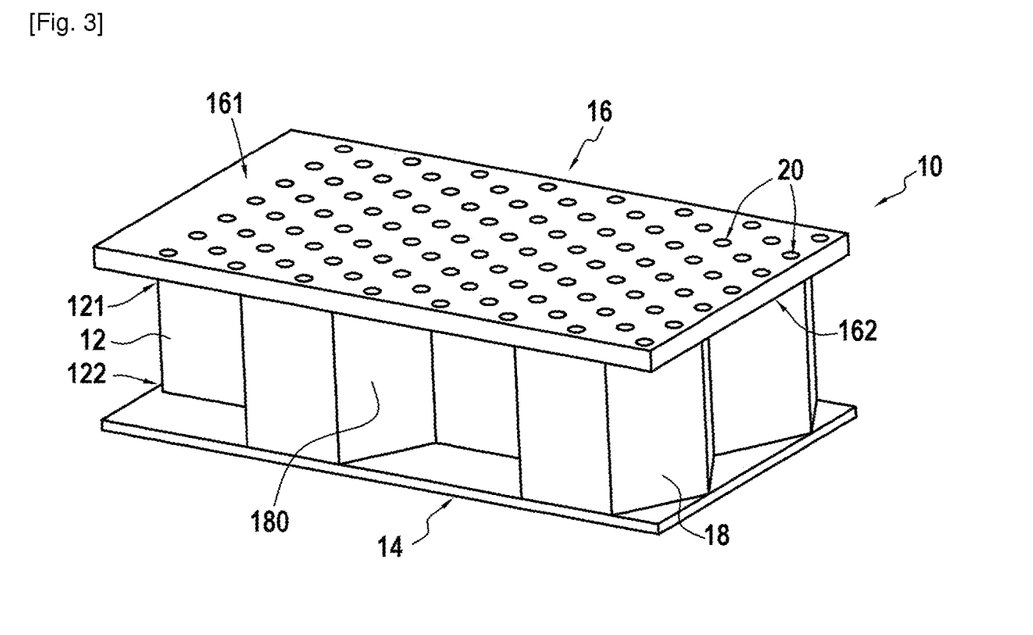
FIG. 3 illustrates a partial perspective view of an acoustic treatment panel according to an embodiment of the invention.

FIG. 3 represents a partial perspective view of an acoustic treatment panel 10 according to an embodiment of the invention.

With reference to FIG. 3, the acoustic treatment panel 10 includes a core 12, a reflective layer or wall 14 and an inlet layer or wall 16 intended to be in contact with a fluid flow F, FP or FS.

The core 12 has a honeycomb structure. More precisely, the core 12 includes a plurality of acoustic cells 18, or honeycomb cells, delimited by walls 180 and arranged according to a known honeycomb structure.

Each honeycomb cell 18 opens on a first face 121 of the core 12 and on the second face 122 of the core 12 situated opposite the first face 121.

The first face 121 of the core 12 is intended to be oriented towards the flow path of the flow of primary air 7 or secondary air 8 according to the placement of the acoustic treatment panel 10. The second face 122 of the core 12 is intended to be oriented opposite to the flow path of air.

According to the embodiment, the core 12 can be made of metal or of a composite material, such as a composite material formed of carbon fibres embedded in a hardened resin matrix.

The reflective layer 14 is suitable for reflecting acoustic waves having a frequency belonging to the predetermined range of frequencies.

The reflective layer 14 extends opposite the second face 122 of the core 12, being in contact with the second face 122. More precisely, the reflective layer 14 is rigidly attached to the second face 122 of the core 12, for example bonded to the second face 122 of the core 12.

According to the embodiment, the reflective layer 14 can be made from metal or from a composite material, such as a composite material formed of carbon fibres embedded in a hardened resin matrix. In an alternative, the layer forming the bottom of the honeycomb cells 18 can be non-reflective.

The entry layer 16 extends opposite the first face 121 of the core 12, being in contact with the first face 121. More precisely, the entry layer 16 is rigidly attached to the first face 121 of the core 12, for example bonded to the first face 121 of the core 12.

The inlet layer 16 is a perforated integral skin comprising a plurality of orifices 20 passing through the inlet layer 16 from the first face 161 to the second face 162 of the inlet layer 16. Each orifice 20 opens onto a honeycomb cell 18 of the core 12, a plurality of orifices 20 being able to open on a same honeycomb cell 18. The inlet layer 16 thus has a porosity of approximately 10% to 15%.

The panels 10 can be panels said to have a single degree of freedom (SDOF), in other words with a single layer of acoustic cells 18, or a panel said to have a double degree of freedom (DDOF), in other words with two layers of acoustic cells 18 superposed one above the other and separated by a septum, i.e. an acoustically porous skin.

Figure 4:
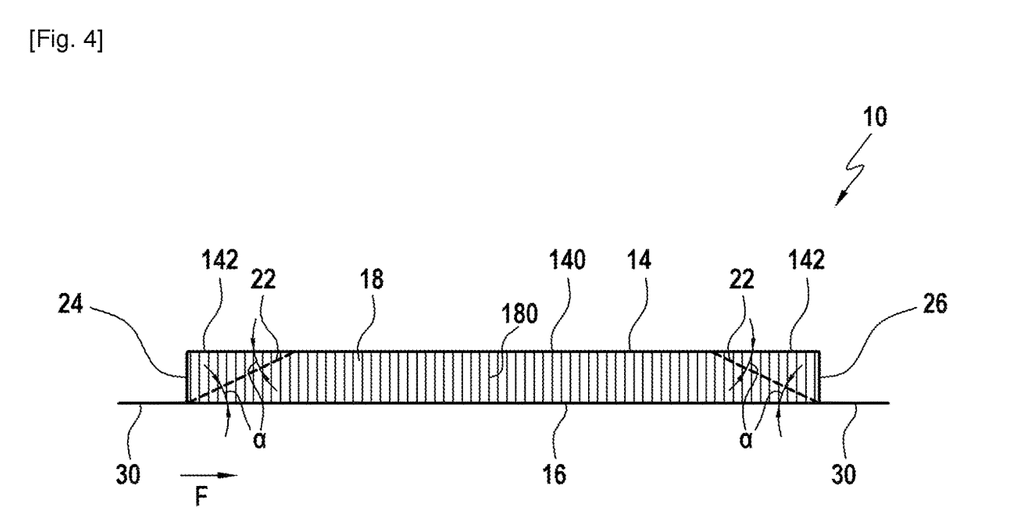
FIG. 4 schematically shows a sectional view of the acoustic treatment panel of FIG. 3.

FIG. 4 schematically shows a sectional view of the acoustic treatment panel 10 of FIG. 3.

As illustrated in FIGS. 3 and 4, the acoustic treatment panel 10 has the general shape of a rectangular parallelepiped, having a generally rectangular shape in cross-section which can be curved in order to follow the walls of the nacelle on which it is mounted.

In cross-section, as illustrated in FIG. 4, the acoustic treatment panel 10 therefore has a rectangular shape, with a width of the rectangle extending orthogonally between the inlet layer 16 and the reflective layer 14, and a length between a first longitudinal end 24 and a second longitudinal end 26, the first and second longitudinal ends 24 and 26 defining the edges of the panel 10.

At each end of the rectangle in the direction of its length, the panel 10 comprises a reinforcing wall 22 extending, inside the panel 10, in an oblique direction between the inlet layer 16 and the reflective layer 14. Each reinforcing wall 22 thus passes through a plurality of cavities 18 of the core 12.

Each reinforcing wall 22 forms an angle ☐ with the reflective layer 14 on the one hand and with the inlet layer 16 on the other hand.

Each reinforcing wall 22 is acoustically transparent, in other words it comprises orifices allowing a part of the acoustic waves to pass without significantly altering them, whether this be in terms of intensity or frequency. In the example illustrated in FIG. 4, the reinforcing walls 22 have a porosity level greater than 18% and preferably between 18% and 80%, in order to ensure acoustic transparency of the reinforcing wall 22 while maintaining a good force transfer capacity.

Each reinforcing wall 22 extends inside the core 12 from the corner formed by an edge 24 or 26 of the panel 10 and the inlet layer 16. The reinforcing wall 22 extends rectilinearly inside the core 12 until it reaches the reflective layer 14.

The angle α formed by a reinforcing wall with the inlet layer 16 is preferably between 15° and 70°.

In an embodiment, the reinforcing wall 22 can be made as a single piece with the portion 140 of the reflective layer 14 situated between the reinforcing walls 22, the reinforcing wall 22 being perforated whereas the portion 140 of reflective layer 14 between the reinforcing walls 22 is acoustically opaque. The portions 142 of reflective layer 14 extending facing a reinforcing wall 22, in other words between an edge 24 or 26 and the portion 140 of reflective layer 14 situated between the reinforcing walls 22, being added from above the reinforcing walls 22 during the manufacture of the panel 10 and secured to the remainder of the panel 10 on aligning the walls 180 of the honeycomb cells 18 of the core 12 in order to ensure the effectiveness of the acoustic treatment. The walls 180 of the honeycomb cells 18 can be perfectly aligned without the effectiveness of the acoustic treatment being too affected. Indeed, the walls 180 guide the acoustic wave in the honeycomb cells 18. If the walls 180 have parallel foils, this guidance is correctly carried out even if the walls 180 are not aligned on either side of the reinforcing wall 22 as long as the latter is acoustically transparent. For a honeycomb, the term "foil" designates the walls defining the honeycomb cells.

Figure 5:
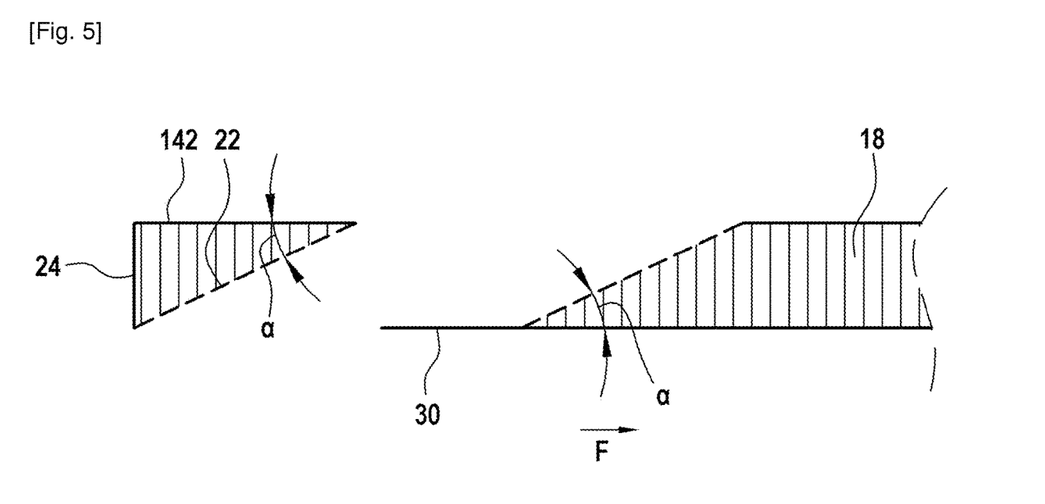
FIG. 5 shows an expanded view of a part of the acoustic treatment panel of FIG. 4 with a triangular portion separated from the remainder of the panel.

The triangular portion, illustrated in particular in FIGS. 4 and 5 (FIG. 5 shows an expanded view of FIG. 5 with the separated triangular portion on the remainder of the panel) separated from the remainder of the panel by a reinforcing wall 22 can be attached and co-fired during manufacture.

Figure 6:
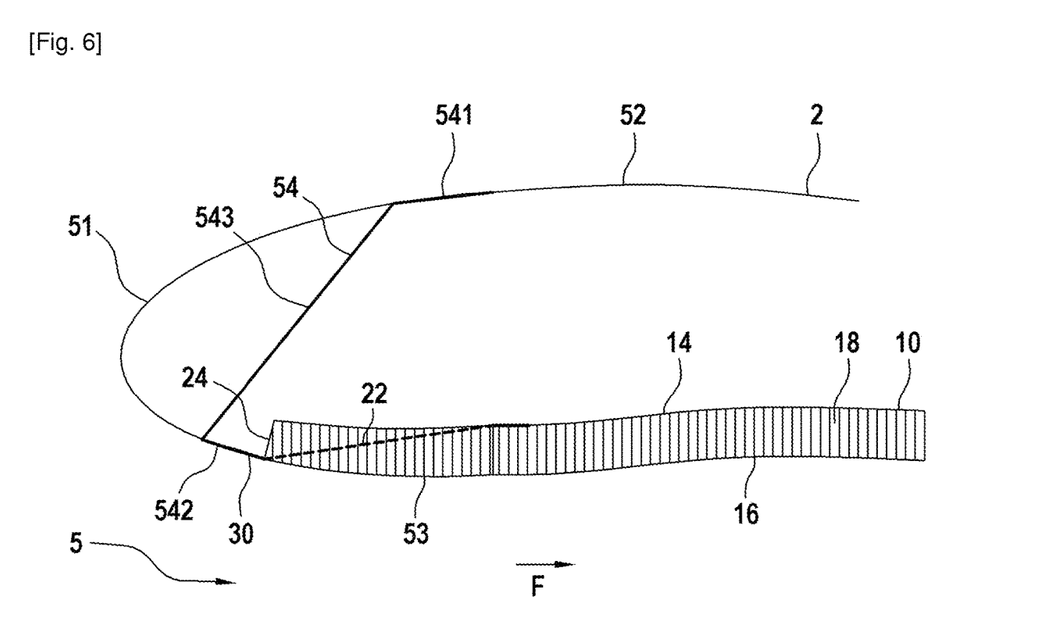
FIG. 6 schematically shows a sectional view of a portion of the nacelle of the propulsion unit of FIG. 2 at the air inlet channel according to a first embodiment.

FIG. 6 schematically shows a sectional view of a portion of the nacelle 2 of the propulsion unit 1 of FIG. 2, according to a first embodiment.

FIG. 6 illustrates the inlet channel 5 receiving the fluid flow F and the portion of the nacelle 2 which radially delimits the inlet channel 5 on the outside. At this location, the nacelle 2 comprises a rounded front lip 51 continued on one side by a radially outer wall 52 of the nacelle 2 and, on the other side, by a radially inner wall 53 of the nacelle 2.

In order to reinforce the structure of the nacelle 2 over this portion, the nacelle comprises a reinforcement partition 54. The reinforcement partition 54 comprises an outer portion 541 fixed on the radially outer wall 52, an inner portion 542 fixed on the radially inner wall 51, and a central portion 543 extending between the inner portion 542 and the outer portion 541 in a rectilinear direction, at a distance from the front lip 51.

The nacelle 2 comprises an acoustic treatment panel 10 as described above. The panel 10 is mounted on the radially inner wall 53 of the nacelle 2 in order that its inlet layer 16 is in contact with the fluid flow F. The panel 10 comprises, on its edge 24 visible in FIG. 6, a fixing border 30 which is in the elongation of the inlet layer 16, outside the area covered by the core 12 of the panel 10.

In an embodiment, the fixing border 30 can be fixed on the radially inner wall 53 of the nacelle, upstream of the inner portion 542 of the reinforcement partition 54, or even on the inner portion 542 of the reinforcement partition 54.

In another embodiment, the reinforcement partition 54 and the fixing border 30 of the side of the edge 24 of the panel 10 can be produced as a single piece.

Figure 7:
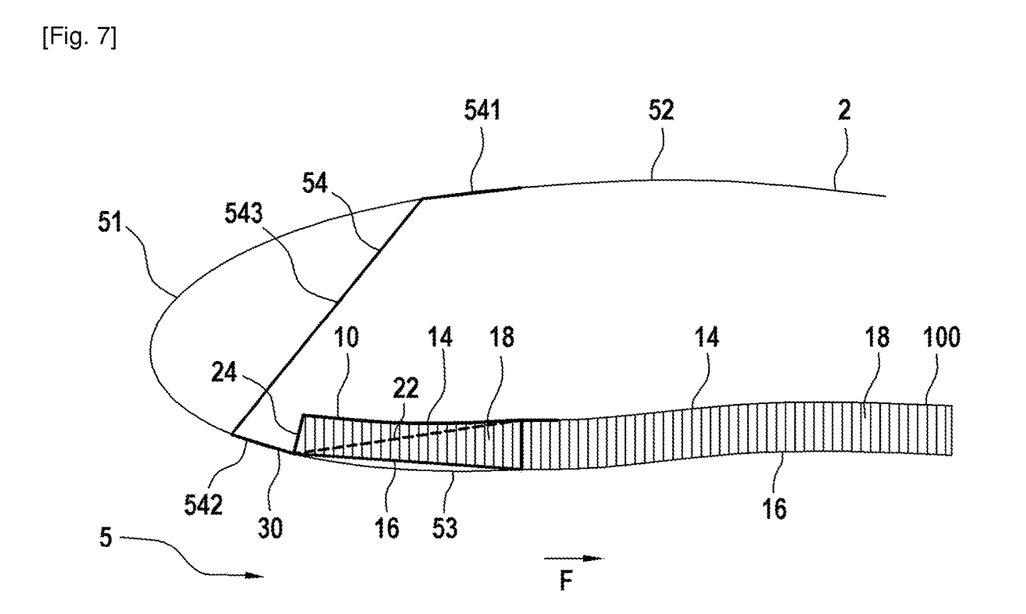
FIG. 7 schematically represents a sectional view of a portion of the nacelle of the propulsion unit of FIG. 2 at the air inlet channel according to a second embodiment.

FIG. 7 illustrates an alternative embodiment of the inlet channel of FIG. 6. In this alternative, the nacelle comprises two acoustic treatment panels: a conventional first acoustic panel 100 without a reinforcing wall, and a second acoustic treatment panel 10 comprising a reinforcing wall 22, the first panel 100 being adjacent to the second panel 10. The second acoustic treatment panel 10 is passed through over its entire length by the reinforcing wall 22. Upstream, the reinforcing wall 22 extends to the outside of the panel 10 in the elongation of the second skin 16 and is fixed on the inner portion 542 of the reinforcement partition 54. Meanwhile, downstream, the reinforcing wall 22 extends to the outside of the panel 10 in the elongation of the first skin 14 and is fixed to the first acoustic treatment panel 100.

In other words, the fixing border 30 which extends in the elongation of the inlet layer 16, can be formed by the portion 22 of reinforcing wall extending to the outside of the panel 10 in the elongation of the second skin 16.

Thus, the two fixing borders 30, the two reinforcing walls 22 and the portion 140 of reflective layer 14 situated between the reinforcing walls 22 can be formed of a same material, or even as a single piece.

The second skin 16 of the second acoustic treatment panel 10 is not rigidly connected to the radially inner wall 53 of the nacelle 2.

Furthermore, in this embodiment the height of the two panels 10 and 100 can be different.

The invention thus makes it possible to provide an acoustic treatment panel for a turbomachine having a structural reinforcement that makes it possible to have a better resistance to the shear stresses which it may be subject to when the turbomachine is in operation, while using all of the surface of the panel for the acoustic treatment.

The invention claimed is:

1. An acoustic treatment panel intended to be disposed on at least one wall of an aircraft propulsion unit in contact with a fluid flow, the panel comprising a first acoustically reflective skin, a second acoustically porous skin intended to be in contact with a fluid flow, a honeycomb structure extending between the first skin and the second skin and comprising a plurality of cavities,
   wherein it comprises at least one acoustically transparent reinforcing wall passing through a plurality of cavities of the honeycomb structure and extending from the second skin to the first skin forming a non-orthogonal angle with the first and second skins, said at least one reinforcing wall being formed in one piece with the first acoustically reflective wall.

2. The acoustic treatment panel according to claim 1, wherein said at least one acoustically transparent reinforcing wall has a perforation rate greater than or equal to 18%.

3. The acoustic treatment panel according to claim 1, wherein the honeycomb structure extends, in a plane parallel to the second skin, inside an outer perimeter, and said at least one reinforcing wall extends inside the honeycomb structure from the second skin to the first skin on a border portion of the honeycomb structure extending, in the plane parallel to the second skin, from said outer perimeter to the interior of the honeycomb structure.

4. The panel according to claim 1, wherein the reinforcing wall comprises a fastening portion extending to the outside of the panel in the elongation of the second skin, the fastening portion being intended to be coupled to a wall of the propulsion unit.

5. The panel according to claim 1, wherein the reinforcing wall comprises a fixing portion extending to the outside of the panel in the elongation of the first skin, the fixing portion being intended to be coupled to a wall of the propulsion unit.

6. The panel according to claim 1, comprising at least one portion of panel extending, in a direction orthogonal to the first skin, between a reinforcing wall and a portion of the first skin, said at least one portion of panel being attached and fixed to the remainder of the panel by co-firing during the manufacture of the panel.

7. A propulsion unit intended to be mounted on an aircraft, the propulsion unit comprising at least one acoustic treatment panel according to claim 1.

8. The propulsion unit according to claim 7, comprising at least one air inlet provided with a front lip, an outer wall and an inner wall, and connected to one of said acoustic treatment panels forming at least one part of the inner wall.

9. The propulsion unit according to claim 8, wherein said reinforcing wall of said acoustic treatment panel continues outside of said panel and is connected to the front lip of the air inlet.

10. An aircraft comprising at least one propulsion unit according to claim 6.

11. A method for manufacturing an acoustic treatment panel intended to be disposed on at least one wall of an aircraft propulsion unit in contact with a fluid flow, the method for manufacturing the panel comprising a step of stacking a first acoustically reflective skin, a honeycomb structure and a second acoustically porous skin intended to be in contact with a fluid flow, the honeycomb structure extending between the first skin and the second skin and comprising a plurality of cavities, wherein the method further comprises a step of installing at least one acoustically transparent reinforcing wall passing through a plurality of cavities of the honeycomb structure and extending from the second skin to the first skin forming a non-orthogonal angle with the first and second skins, said at least one reinforcing wall being formed in one piece with the first acoustically reflective wall.

12. The method according to claim 11, comprising a step of producing at least one portion of panel intended to extend, in a direction orthogonal to the first skin, between a reinforcing wall and a portion of the first skin, and a step of connecting, by co-firing, said at least one portion of panel to the remainder of the panel.

* * * * *